United States Patent [19]

Inoue et al.

[11] Patent Number: 4,615,863

[45] Date of Patent: Oct. 7, 1986

[54] PROCESS FOR PRODUCTION OF READILY SINTERABLE ALUMINUM NITRIDE POWDER

[75] Inventors: Hiroshi Inoue, Kawaguchi; Akihiko Tsuge, Yokohama; Katsutoshi Komeya, Oiso, all of Japan

[73] Assignee: Kabushiki Kaisha Toshiba, Kawasaki, Japan

[21] Appl. No.: 768,137

[22] Filed: Aug. 22, 1985

[30] Foreign Application Priority Data

Sep. 28, 1984 [JP] Japan ............................ 59-203565
Dec. 27, 1984 [JP] Japan ............................ 59-274093

[51] Int. Cl.$^4$ ............................................. B22F 1/00
[52] U.S. Cl. .................................... 419/23; 419/34; 419/45; 419/57; 423/409; 501/96; 156/DIG. 99; 156/DIG. 104; 264/125; 264/332
[58] Field of Search ............... 419/45, 57, 23, 34; 501/96; 423/409; 264/65, 60, 332, 125; 156/DIG. 99, DIG. 104

[56] References Cited

U.S. PATENT DOCUMENTS 3,989,559  11/1976  Lin et al. ........................ 419/31
4,435,513   3/1984  Komeya et al. ................ 501/96
4,540,673   9/1985  Takeda et al. .................. 501/96

FOREIGN PATENT DOCUMENTS 284531   12/1912  German Democratic Rep.
2127390   4/1984  United Kingdom.

*Primary Examiner*—Stephen J. Lechert, Jr.
*Attorney, Agent, or Firm*—Schwartz, Jeffery, Schwaab, Mack, Blumenthal & Evans

[57] ABSTRACT

A process for producing readily sinterable aluminum nitride powder, which comprises mixing (i) alumina powder and/or powder of a compound capable of forming alumina by heat treatment,
(ii) carbon powder and/or powder of a compound capable of forming carbon by heat treatment, and
(iii) powder of at least one compound selected from the group consisting of alkaline earth metal oxides, compounds capable of forming said alkaline earth metal oxides by heat treatment, rare earth element oxides and compounds capable of forming said rare earth element oxides by heat treatment, and calcining the resulting mixture in a nitrogen-containing non-oxidative atmosphere, provides an aluminum nitride powder which is readily sinterable without further mixing with a sintering aid.

12 Claims, No Drawings

PROCESS FOR PRODUCTION OF READILY SINTERABLE ALUMINUM NITRIDE POWDER

BACKGROUND OF THE INVENTION

This invention relates to a process for producing readily sinterable aluminum nitride powder, more particularly to a process for producing readily sinterable aluminum nitride powder which can produce a homogeneous and dense aluminum nitride sintered body without further adding a sintering aid.

A sintered body of aluminum nitride has good stability at high temperature and high thermal conductivity and its uses as useful high temperature materials are going to be developed.

Such a sintered body can be produced by, for example, molding a powdery mixture of aluminum nitride powder and a sintering aid into a molded body with a desired shape, and sintering the molded body in a predetermined atmosphere (primarily of nitrogen) at a predetermined temperature.

Provided that the molding and sitering conditions, etc. are the same, the characteristics of the sintered body will be greatly affected by various factors such as the average particle size, variance in particle sizes and shapes of the particles of the aluminum nitride powder employed as the starting powder.

Whereas, in the prior art, aluminum nitride powder has been produced by such a method as direct nitrogenation of aluminum powder or carbon reduction-nitrogenation of alumina powder. However, according to these methods of the prior art, it has been very difficult to make particle sizes smaller, to make their variance smaller and also to make particle shapes uniform.

Also, the characteristics of the sintered body will also greatly be affected by the condition of the sintering aid to be formulated at the same time (e.g. difference in powder shape and particle size between of the starting material and the additive, the state under which both the starting material powder and the additive powder are dispersed, etc.).

Further, although a method employing a ball mill, etc. is usually applied for mixing of aluminum nitride powder and powder of a sintering aid, no ideal homogeneous mixed state can be attained in mixing both powdery partners, whereby homogeneity in characteristics in a sintered body must but be unsatisfactory.

SUMMARY OF THE INVENTION

An object of the present invention is to provide a process for producing aluminum nitride powder which is small in particle size, small in variance of the particle sizes and also uniform in particle shapes and in which a sintering aid is uniformly dispersed, as well as which has itself ready sinterability without further mixing with a sintering aid upon sintering.

The process for producing readily sinterable aluminum nitride powder comprises mixing (i) aluminum powder and/or powder of a compound capable of forming aluminum by heat treatment, (ii) carbon powder and/or powder of a compound capable of forming carbon by heat treatment and (iii) powder of at least one compound selected from the group consisting of alkaline earth metal oxides, compounds capable of forming said alkaline earth metal oxides by heat treatment, rare earth element oxides and compounds capable of forming said rare earth element oxides by heat treatment, and calcining the resultant mixture in a nitrogen-containing non-oxidative atmosphere.

THE DETAILED DESCRIPTION OF THE PREFERRED EMBODIMENTS

The first starting powder is preferably alumina powder or powder of a compound capable of forming alumina when subjected to heat treatment. The latter may include, for example, aluminum nitrate $[Al(NO_3)_3]$, sodium aluminate $(NaAlO_2)$ and the like. These can be pyrolyzed in the calcination step as hereinafter described to be transformed into alumina powder.

The second starting powder is carbon powder or powder of a compound capable of forming carbon when subjected to heat treatment. The former may include, for example, carbon black, graphite, etc., and the latter may include, for example, materials of various resin systems. These can be pyrolyzed in the calcination step as hereinafter described to be transformed into carbon powder.

The carbon powder described above functions as a reducing agent in the calcination step to reduce the alumina powder described above and the sintering aid described below.

The third starting powder is powder of at least one compound selected from the group consisting of alkaline earth metal oxides or compounds capable of forming said oxides when subjected to heat treatment and rare earth element oxides or compounds capable of forming said oxides when subjected to heat treatment. The alkaline earth metal oxides may include magnesium oxide, calcium oxide, strontium oxide, barium oxide and the like. The compound capable of forming powder of these oxides when subjected to heat treatment may include, for example, various inorganic compounds and organic metal compounds such as nitrates, oxalates, acetates, carbonates, etc. of the group IIa elements. The latter can be pyrolyzed in the calcination step to be transformed into the corresponding oxide. The rare earth element oxides may include, for example, yttrium oxide, lanthanum oxide, cerium oxide, samarium oxide and the like. The compounds capable of forming these rare earth element oxides when subjected to heat treatment may include, for example, nitrates such as yttrium nitrate $[Y(NO_3)_3]$, carbonates such as yttrium carbonate $[Y_2(CO_3)_3]$ and the like. The latter can be pyrolyzed in the calcination step to be transformed into the corresponding oxide.

As each of these three starting powders, powder having a purity of 99% or higher may be employed. Also, in the first and second starting powders, their particle sizes are 2.0 $\mu m$ or less, preferably 0.5 $\mu m$ or less, and in the case of the third starting powder, 5.0 $\mu m$ or less, preferably 2.0 $\mu m$ or less. Such starting powders can easily be produced according to conventional industrial techniques.

In the process of the present invention, first the above three kinds of powders are mixed together. In this operation, the carbon powder is formulated at a proportion of 0.35 to 2.0 parts by weight, preferably 0.4 to 1.0 parts by weight, to 1 part of the alumina powder, and the oxide powder is formulated at a proportion of 0.005 to 1.0 parts by weight, preferably 0.005 to 0.1 parts by weight, to 1 part of the alumina powder. At a level of carbon powder formulated less than 0.35 parts by weight, alumina powder will remain in greater amount under an unreacted state, while at a level over 2.0 parts by weight, formation of aluminum nitride may be possible but its yield will be lowered. When an excessive amount of carbon is formulated, unreacted carbon remains in the calcined powder and it can be removed by further calcining the calcined product in an oxidative atmosphere at a temperature of 600° to 850° C.

When a level of a level of the oxide formulated is less than 0.005 parts by weight, its effect as a sintering aid and "seed" is small, while when a level is over 1.0 parts by weight, in the powder obtained by calcination, the properties of these oxides will be exhibited markedly with the characteristics of aluminum nitride being lost, whereby the object cannot be accomplished.

Also, when a compound capable of forming alumina powder by heat treatment, a compound capable of forming carbon powder by heat treatment or a compound capable of forming an alkaline earth metal oxide or a rare earth element oxide by heat treatment is used as a starting powder, each of the amount formulated may be set so that the amount of each product may satisfy mutually the proportion as specified above.

When powder of at least one compound selected from the group consisting of alkaline earth metal oxides and compounds capable of forming said oxides by heat treatment is used as the third starting powder in combination with powder of at least one compound selected from the group consisting of rare earth element oxides and compounds capable of forming said oxides by heat treatment, the ratio of the total amount of the former to the total amount of the latter may usually be 0.2 to 5, preferably 0.3 to 3.

A typical example of a process for producing the aluminum nitride powder of the present invention is described below.

Alumina powder, carbon powder and powder of at least one compound selected from the group consisting of alkaline earth metal oxides and rare earth element oxides are mixed in a predetermined amount and the resulting mixed powder is charged into a carbon vessel and calcined in a nitrogen-containing non-oxidative atmosphere at a determined temperature for a determined period.

The calcined powder obtained is treated in air at a predetermined temperature for a predetermined period to remove residual carbon by oxidation, whereby the desired aluminum nitride is produced.

In the above process, the respective starting powders can be mixed by use of, for example, a ball mill, etc.

The mixed powder obtained is calcined in a nitrogen-containing non-oxidative atmosphere. Although the applicable atmosphere may include nitrogen gas, ammonia gas alone, nitrogen-argon gas mixture and hydrogen-nitrogen gas mixture, nitrogen gas atmosphere is preferable from industrial point of view.

The calcination temperature may be 1400° to 1850° C., preferably 1450° to 1600° C. At a temperature lower than 1400° C., aluminum nitride powder can be formed with difficulty, while at a temperature higher than 1850° C., the particle sizes of the aluminum nitride powder obtained will become undesirably too large. The calcination time may be 2 to 20 hours, preferably 5 to 10 hours.

Thus, according to the present invention, by calcining the above described starting materials in a nitrogen-containing non-oxidative atmosphere, growth of aluminum nitride, which has been formed by reducing reaction of the alumina powder with the carbon powder upon calcination, proceeds with the alkaline earth metal oxides and/or the rare earth element oxides contained in the starting matertials as a nucleus.

As a result, there can be obtained readily sinterable aluminum nitride powder which is small in particle size, (for example, 2.0 $\mu$m or less, and as occasion demands, 1.0 $\mu$m or less), small in variance of particle sizes or particle shapes and which involves therein an alkaline earth metal oxide or a rare earth element oxide as a sintering aid. Although in the above step, a part of the powder of the alkaline earth metal oxide or the rare earth element oxide sometimes may be reduced and nitrogenated, functions thereof as a nucleus during the synthetic reaction of aluminum nitride and as a sintering aid are not impaired. Moreover, since the alkaline earth metal oxide or the rare earth element oxide exists in the reaction system before formation of aluminum nitride, growth of minute aluminum nitride proceeds with these oxides as a nucleus. Accordingly, the aluminum nitride and the alkaline earth metal oxide or the rare earth element oxide can ideally be dispersed and thus direct molding and sintering can advantageously be conducted when occasion requires.

The present invention will be described in more detail by reference to the following examples.

EXAMPLE 1

One part by weight of alumina powder with an average particle size of 0.05 $\mu$m, 0.5 part by weight of carbon black with an average particle size of 0.05 $\mu$m and 0.05 part by weight of calcium oxide powder with an average particle size of 0.7 $\mu$m were mixed, and 100 g of the mixed powder obtained was charged in a carbon vessel and calcined in nitrogen gas stream at 10 l/min. at 1550° C. for 5 hours.

The calcined powder obtained was treated in air at 650° C. for 3 hours to remove residual carbon by oxidation. The powder obtained was analyzed by X-ray diffraction to confirm that the product consisted mostly of aluminum nitride. The average particle size was found to be 1.2 $\mu$m, with its variance being 1.9 to 0.8 $\mu$m.

Next, this powder was filled into a mold cavity and pressed under a pressure of 300 kg/cm$^2$ to mold a plate of 30 mm $\times$ 30 mm $\times$ 5 mm thickness. This plate was sintered in nitrogen atmosphere at 1780° C. for 2 hours. A dense aluminum nitride plate with a relative density of 98% or more was obtained.

EXAMPLES 2 TO 21

At proportions indicated in Table 1, respective starting powders (all having the same particle sizes as in Example 1) were mixed and respective mixed powders were calcined under the conditions also indicated in Table 1. From the respective calcined powders obtained, aluminum nitride plates were prepared according to the method as in Example 1. The results of relative density of the plate and semi-quantitative analysis of the calcined components are shown in Table 1.

TABLE 1

| | Starting powder (wt. parts) | | | | Calcining conditions | | | Results | Relative density (%) |
|---|---|---|---|---|---|---|---|---|---|
| | Alumina powder | Carbon black | Powder of oxide | | Temperature (°C.) | Time (hr) | Atmosphere | Semi-quantitative analysis of calcined powder* | |
| Example 2 | 1 | 0.35 | CaO | 0.05 | 1550 | 5 | $N_2$ | AlN(+++++), CaO(+) | >98 |
| Example 3 | 1 | 2 | CaO | 0.05 | 1550 | 5 | $N_2$ | AlN(+++++), CaO(+) | >98 |
| Example 4 | 1 | 0.5 | CaO | 0.005 | 1550 | 5 | $N_2$ | AlN(+++++), CaO(+) | 97 |
| Example 5 | 1 | 0.5 | CaO | 1.0 | 1550 | 5 | $N_2$ | AlN(+++++), CaO(+) | >90 |
| Example 6 | 1 | 0.5 | CaO | 0.05 | 1400 | 5 | $N_2$ | AlN(+++++), CaO(+), $Al_2O_3$(+) | >90 |
| Example 7 | 1 | 0.5 | CaO | 0.05 | 1850 | 5 | $N_2$ | AlN(+++++), CaO(+) | 95 |
| Example 8 | 1 | 0.5 | SrO | 0.05 | 1550 | 5 | $N_2$ | AlN(+++++), SrO(+) | 98 |
| Example 9 | 1 | 0.5 | BaO | 0.05 | 1550 | 5 | $N_2$ | AlN(+++++), BaO(+) | 98 |
| Example 10 | 1 | 0.5 | CaO $Y_2O_3$ | 0.02 0.02 | 1550 | 5 | $N_2$ | AlN(+++++), CaO(+), $Y_2O_3$(+) | >90 |
| Example 11 | 1 | 0.5 | CaO $La_2O_3$ | 0.02 0.02 | 1550 | 5 | $N_2$ | AlN(+++++), CaO(+), $La_2O_3$(+) | >99 |
| Example 12 | 1 | 0.5 | CaO $Y_2O_3$ $La_2O_3$ | 0.02 0.01 0.01 | 1550 | 5 | $N_2$ | AlN(+++++), CaO, $Y_2O_3$, $La_2O_3$(<+) | >99 |
| Example 13 | 1 | 0.5 | SrO $Sm_2O_3$ | 0.02 0.02 | 1550 | 5 | $N_2$ | AlN(+++++), SrO(+), $Sm_2O_3$(+) | >99 |
| Example 14 | 1 | 0.5 | $CaCO_3$ $Y_2O_3$ | 0.02 0.02 | 1550 | 5 | $N_2$ | AlN(+++++), CaO(+), $Y_2O_3$(+) | >99 |
| Example 15 | 1 | 0.35 | CaO $Y_2O_3$ | 0.02 0.02 | 1550 | 5 | $N_2$ | AlN(+++++), CaO(+), $Y_2O_3$(+) | >99 |
| Example 16 | 1 | 2 | $CaCO_3$ $Y_2O_3$ | 0.03 0.02 | 1550 | 5 | $N_2$ | AlN(+++++), CaO(+), $Y_2O_3$(+) | >99 |
| Example 17 | 1 | 0.5 | CaO $Dy_2O_3$ | 0.5 0.5 | 1550 | 5 | $N_2$ | AlN(++++), CaO(++), $Dy_2O_3$(++) | >99 |
| Example 18 | 1 | 0.5 | SrO $Sm_2O_3$ | 0.02 0.02 | 1850 | 2 | $N_2$ | AlN(+++++), SrO(+), $Sm_2O_3$(+) | >98 |
| Example 19 | 1 | 0.5 | $CaCO_3$ $La_2O_3$ | 0.02 0.02 | 1400 | 5 | $N_2$ | AlN(+++++), CaO(+), $La_2O_3$(+) | >99 |
| Example 20 | 1 | 0.5 | CaO $Y_2O_3$ | 0.02 0.02 | 1550 | 5 | $N_2$ | AlN(+++++) | >98 |
| Example 21 | 1 | 0.5 | SrO $CeO_2$ $Y_2O_3$ | 0.02 0.02 0.01 | 1550 | 5 | $N_2$ | AlN(+++++), $CeO_2$(+), $Y_2O_3$(+) | >99 |

*+++++ > ++++ > +++ > ++ > + > <+

As is apparent from Table 1, according to the present invention, there can be produced aluminum nitride powder which is small in paricle size and small in its variance, and also has itself ready sinterability without mixing with a sintering aid. Employment of the above powder gives aluminum nitride sintered bodies with high density.

EXAMPLE 22

One part by weight of alumina powder with an average particle size of 0.05 μm, 0.5 parts by weight of carbon black with an average particle size of 0.05 μm and 0.05 parts by weight of yttrium oxide powder with an average particle size of 0.7 μm were mixed to prepare 100 g of starting powder, and this starting powder was charged in a carbon vessel and calcined in nitrogen gas stream at 10 l/min. at 1550° C. for 5 hours. The calcined powder obtained was powder containing carbon in a small amount. Subsequently, this product was treated in air at 650° C. for 3 hours to remove residual carbon. The product obtained was analyzed by X-ray diffraction to confirm that the product consisted mostly of aluminum nitride. The distribution of particle size of the product (powder) was investigated to confirm that the average particle size ranged from 0.1 to 2.0 μm, its particle sizes were small and its variance in particle shapes and particle sizes was small.

The above aluminum nitride powder is molded into a shape of 30 mm × 30 mm × 5 mm by use of a mold cavity and then the resulting molded body was sintered in nitrogen atmosphere at 1780° C. for 2 hours to produce an aluminum nitride sintered body.

COMPARATIVE EXAMPLE 1

To 100 parts by weight of aluminum nitride powder with an average particle size of 1.8 μm were added 3 parts by weight of yttrium oxide powder with an average particle size of 0.7 μm and the resulting mixture was mixed according to the ball mill method to prepare starting powder for sintered body. Subsequently, the above starting powder was molded and sintered under the same conditions as in Example 1 to produce aluminum nitride sintered body.

Then, relative densities and thermal conductivities were measured with respect to the aluminum nitride sintered bodies in Example 22 and Relative example 1 and as a result, relative density of the sintered body in Example 22 was extremely high as 98% or more, while relative density of the sintered body in Comparative example 1 was 92%. Thermal conductivity of the sintered body in Example 22 was extremely high as 93 W/m·k, while thermal conducivity of the sintered body in Comparative example 1 was 50 W/m·k.

EXAMPLES 23 TO 30

Alumina powder with an average particle size of 0.05 μm, carbon black with an average particle size of 0.05 μm or less and a rare earth element oxide with an average particle size of 0.7 μm were mixed at a formulation rate indicated in Table 2 to prepare starting powder and then the above mixed powder was sintered under the conditions indicated in Table 2 and further treated in air at a temperature of 650° C. for about 3 hours to remove carbon, whereby 8 kinds of aluminum nitride powder were obtained. Each of the aluminum nitride powders obtained was analyzed by X-ray diffraction to investigate the component and particle size distribution thereof. The results are also shown in Table 2.

Moreover, each of the aluminum nitride powders thus obtained was molded and sintered under the same conditions as in Exmaple 22 described above to produce 8 kinds of aluminum nitride sintered bodies.

Then, relative densities and thermal conductivities were measured with respect to the aluminum nitride sintered bodies in Examples 23 to 30. The results are shown in Table 2. The characteristics of the aluminum nitride sintered bodies in Example 22 and Comparative example 1 described above are also shown in Table 2.

TABLE 2

| | Ratio of starting powder component (wt. parts) | | | Synthesis conditions | | | Characteristics of synthesized powder | | Characteristics of sintered body | |
|---|---|---|---|---|---|---|---|---|---|---|
| | $Al_2O_3$ | C | Rare earth element oxide | Temperature (°C.) | Time (hr) | Atmosphere | Constituent phase | Distribution of particle size (μm) | Relative density (%) | Thermal conductivity (W/m·k) |
| Example 22 | 1 | 0.5 | 0.05;$Y_2O_3$ | 1550 | 5 | $N_2$ | AlN(++++++), $Y_2O_3$(+) | 0.1–2.0 | >98 | 93 |
| Example 23 | 1 | 0.35 | 0.05;$Y_2O_3$ | 1550 | 5 | $N_2$ | AlN(++++), $Y_2O_3$(+) | 0.1–2.0 | >98 | 94 |
| Example 24 | 1 | 2 | 0.05;$Y_2O_3$ | 1550 | 5 | $N_2$ | AlN(++++), $Y_2O_3$(+) | 0.1–1.8 | >98 | 92 |
| Example 25 | 1 | 0.5 | 0.05;$Y_2O_3$ | 1550 | 5 | $N_2$ | AlN(++++), $Y_2O_3$(<+) | 0.1–2.0 | >97 | 98 |
| Example 26 | 1 | 0.5 | 1.0;$Y_2O_3$ | 1550 | 5 | $N_2$ | AlN(++++), $Y_2O_3$(+) | 0.3–2.1 | >90 | 90 |
| Example 27 | 1 | 0.5 | 0.05;$Y_2O_3$ | 1400 | 5 | $N_2$ | AlN(+++), $Al_2O_3$(++), $Y_2O_3$(+) | 0.1–2.0 | >90 | 93 |
| Example 28 | 1 | 0.5 | 0.05;$Y_2O_3$ | 1850 | 5 | $N_2$ | AlN(++++), $Y_2O_3$(+) | 0.4–2.3 | >90 | 91 |
| Example 29 | 1 | 0.5 | 0.05;$Sm_2O_3$ | 1550 | 5 | $N_2$ | AlN(++++), $Sm_2O_3$(+) | 0.1–2.0 | >95 | 95 |
| Example 30 | 1 | 0.5 | 0.05;$Ce_2O_3$ | 1550 | 5 | $N_2$ | AlN(++++), $Ce_2O_3$(+) | 0.1–2.0 | >95 | 96 |
| Comparative Example 1 | | | — | | | | | 0.7–2.8 | 92 | 50 |

*Amount of constituent phase: ++++++ > +++++ > ++++ > +++ > ++ > +

As is apparent from Table 2, the aluminum nitride powder produced according to the present method was found to be small in particle size and small in variance of particle shapes or particle sizes. Moreover, it was found that, by molding and sintering the above aluminum nitride powder as starting powder for sintered body, aluminum nitride sintered body having extremely high thermal conductivity could be obtained.

As described above in great detail, the present invention has remarkable effects that readily sinterable aluminum nitride powder which is small in particle size and small in variance of particle shapes or particle sizes, and in which the sintering aid is uniformly dispersed can be produced, and thus aluminum nitride sintered body having excellent characteristics can be obtained by molding and sintering the above powder as starting powder.

We claim:

1. A process for producing readily sinterable aluminum nitride powder, comprising the steps of
   (A) mixing
   (i) alumina powder and/or powder of a compound capable of forming alumina by heat treatment,
   (ii) carbon powder and/or powder of a compound capable of forming carbon by heat treatment, and
   (iii) powder of at least one compound selected from the group consisting of alkaline earth metal oxides, compounds capable of forming said alkaline earth metal oxides by heat treatment, rare earth element oxides and compounds capable of forming said rare earth element oxides by heat treatment; and
   (B) calcining the resulting mixture in a nitrogen-containing non-oxidative atmosphere.

2. The process according to claim 1, wherein
   (i) 1 part by weight of alumina powder and/or powder of a compound capable of forming alumina by heat treatment,
   (ii) 0.35 to 2.0 parts by weight of carbon powder and/or powder of a compound capable of forming carbon by heat treatment and
   (iii) 0.005 to 1.0 part by weight of powder of at least one compound selected from the group consisting of alkaline earth metal oxides, compounds capable of forming said alkaline earth metal oxides by heat treatment, rare earth element oxides and compounds capable of forming said rare earth element oxides by heat treatment
   are mixed and then the resulting mixture is calcined.

3. The process according to claim 2, wherein
   (i) 1 part by weight of alumina powder and/or powder of a compound capable of forming alumina by heat treatment,
   (ii) 0.4 to 1.0 parts by weight of carbon powder and/or powder of a compound capable of forming carbon by heat treatment and
   (iii) 0.005 to 0.1 part by weight of powder of at least one compound selected from the group consisting of alkaline earth metal oxides, compounds capable of forming said alkaline earth metal oxides by heat treatment, rare earth element oxides and compounds capable of forming said rare earth element oxides by heat treatment are mixed and then the resulting mixture is calcined.

4. The process according to claim 1 wherein
  (i) alumina powder and/or powder of a compound capable of forming alumina by heat treatment,
  (ii) carbon powder and/or powder of a compound capable of forming carbon by heat treatment,
  (iii) powder of at least one compound selected from the group consisting of alkaline earth metal oxides and compounds capable of forming said oxides by heat treatment and
  (iv) powder of at least one compound selected from the group consisting of rare earth element oxides and compounds capable of forming said oxides by heat treatment are mixed and then the resulting mixture is calcined in a nitrogen-containing non-oxidative atmosphere.

5. The process according to claim 4, wherein the formulation ratio of the powder of at least one compound selected from the group of alkaline earth metal oxides and compounds capable of forming said oxides by heat treatment to the powder of at least one compound selected from the group of rare earth element oxides and compounds capable of forming said oxides by heat treatment is 0.2 to 5.

6. The process according to claim 1, wherein the compound capable of forming alumina by heat treatment is aluminum nitrate or sodium aluminate.

7. The process according to claim 1, wherein the carbon is carbon black or graphite, and the compound capable of forming carbon by heat treatment is materials of resin systems.

8. The process according to claim 1, wherein the alkaline earth metal oxides are magnesium oxide, calcium oxide, strontium oxide or barium oxide, and the compounds capable of forming said oxides by heat treatment are nitrates, oxalates, acetates, carbonates or organic metal compounds of alkaline earth metal elements.

9. The process according to claim 1, wherein the rare earth element oxides are yttrium oxide, lanthanum oxide, cerium oxide or samarium oxide, and the compounds capable of forming said oxides by heat treatment are nitrates or carbonates of rare earth elements.

10. The process according to claim 1, wherein the particle sizes of the alumina powder and the carbon powder are 2.0 μm or less, respectively, and the particle sizes of the powder of said oxides or compounds capable of forming said oxides by heat treatment are 5.0 μm or less, respectively.

11. The process according to claim 1, wherein the temperature for calcination sintering is in the range of 1400° to 1850° C.

12. The process according to claim 1, wherein the nitrogen-containing non-oxidative atmosphere under which calcination is conducted is nitrogen gas, ammonia gas, nitrogen-argon gas mixture or hydrogen-nitrogen gas mixture.

* * * * *